United States Patent
Ohata et al.

(10) Patent No.: US 11,206,452 B2
(45) Date of Patent: Dec. 21, 2021

(54) VIDEO DISPLAY SYSTEM, INFORMATION PROCESSING APPARATUS, AND VIDEO DISPLAY METHOD

(71) Applicant: Sony Interactive Entertainment Inc., Tokyo (JP)

(72) Inventors: Koji Ohata, Tokyo (JP); Motohiko Akiyama, Tokyo (JP); Tsuruya Okuma, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 16/794,469

(22) Filed: Feb. 19, 2020

(65) Prior Publication Data
US 2020/0288202 A1 Sep. 10, 2020

(30) Foreign Application Priority Data
Mar. 8, 2019 (JP) .............................. JP2019-042758

(51) Int. Cl.
| H04N 21/462 | (2011.01) |
| H04N 21/472 | (2011.01) |
| H04N 21/488 | (2011.01) |
| H04N 21/478 | (2011.01) |
| H04N 21/4627 | (2011.01) |
| H04N 21/41 | (2011.01) |
| H04N 21/43 | (2011.01) |
| H04N 21/4788 | (2011.01) |

(52) U.S. Cl.
CPC ..... *H04N 21/4627* (2013.01); *H04N 21/4122* (2013.01); *H04N 21/4302* (2013.01); *H04N 21/4788* (2013.01); *H04N 21/47202* (2013.01); *H04N 21/4882* (2013.01)

(58) Field of Classification Search
CPC .......... H04N 21/4122; H04N 21/4302; H04N 21/4627; H04N 21/47202; H04N 21/4788; H04N 21/4882
USPC .......................................................... 725/25
See application file for complete search history.

(56) References Cited

U.S. PATENT DOCUMENTS

| 2011/0225614 A1* | 9/2011 | West .................. H04N 21/4788 725/63 |
| 2019/0139321 A1* | 5/2019 | Kocharlakota ......... G06F 3/011 |
| 2020/0107076 A1* | 4/2020 | DeLuca ................ H04L 63/107 |
| 2020/0169586 A1* | 5/2020 | Wang ...................... G06F 3/011 |

FOREIGN PATENT DOCUMENTS

WO 2017/110632 A1 6/2017

* cited by examiner

*Primary Examiner* — Dominic D Saltarelli
(74) *Attorney, Agent, or Firm* — Katten Muchin Rosenman LLP

(57) ABSTRACT

Provided is a video display system including: an apparatus of a first user having a viewing right to a given video; a second user apparatus; and a display control section, in which the first user apparatus sends an invitation for viewing of the video to the second user apparatus, the second user apparatus causes the video viewing invitation to be displayed, and the display control section causes the second user apparatus to initiate display of the video synchronously with causing the first user apparatus to initiate the display of the video in a case where the second user has a viewing right to the video and in a case where manipulation for accepting the invitation is input to the second user apparatus.

9 Claims, 12 Drawing Sheets

VIDEO DISPLAY SYSTEM, INFORMATION PROCESSING APPARATUS, AND VIDEO DISPLAY METHOD

BACKGROUND

The present technology relates to a data processing technology and particularly to a video display system, an information processing apparatus, and a video display method.

A system has been developed that displays, on a head-mounted display, a panoramic image that changes with change in a direction of a line of sight of a user wearing the head-mounted display as the user rotates his or her head. It is possible to enhance a sense of immersion into a virtual space.

On the other hand, recent years have seen widespread use of video on demand (hereinafter, also referred to as "VOD") services in which viewers can watch a variety of videos (also referred to as "picture content") at desired times.

A related technology is disclosed in PCT Patent Publication No. WO2017/110632.

SUMMARY

VOD services to date have been designed such that individual viewers watch videos at their own timings. However, the present inventor came up with an idea of providing an innovative viewing experience by realizing a "Watch Together" viewing experience for a plurality of viewers in a manner similar to viewing in a movie theater.

The present disclosure has been devised in light of the foregoing, and it is desirable to provide an innovative viewing experience to viewers watching a video.

According to an embodiment of the present disclosure, there is provided a video display system that includes an apparatus of a first user having a viewing right to a given video, a second user apparatus, and a display control section. The first user apparatus sends an invitation for viewing of the video to the second user apparatus, and the second user apparatus causes the video viewing invitation to be displayed. The display control section causes the second user apparatus to initiate display of the video synchronously with causing the first user apparatus to initiate the display of the video in a case where the second user has a viewing right to the video and in a case where manipulation for accepting the invitation is input to the second user apparatus.

According to another embodiment of the present disclosure, there is provided a video display system that includes an apparatus of a first user having a viewing right to a given video, a second user apparatus, and a display control section. The first user apparatus sends an invitation for viewing of the video with the viewing right to the second user apparatus, and the second user apparatus causes the video viewing invitation to be displayed. The display control section causes the second user apparatus to initiate display of the video synchronously with causing the first user apparatus to initiate the display of the video in a case where manipulation for accepting the invitation is input to the second user apparatus irrespective of whether or not the second user has a viewing right to the video.

According to still another embodiment of the present disclosure, there is provided an information processing apparatus that is an apparatus of a first user having a viewing right to a given video and includes an invitation transmission section and an instruction issuing section. The invitation transmission section sends an invitation for viewing of the video to a second user apparatus. The second user apparatus sends data to an effect that the second user accepts the invitation in a case where the second user has a viewing right to the video. The instruction issuing section performs a process of causing the second user apparatus to initiate display of the video synchronously with causing the information processing apparatus to initiate the display of the video in a case where the data to the effect that the second user has accepted the invitation is received from the second user apparatus.

According to still another embodiment of the present disclosure, there is provided an information processing apparatus that is an apparatus of a first user having a viewing right to a given video and includes an invitation transmission section and an instruction issuing section. The invitation transmission section sends an invitation for viewing of the video with the viewing right to a second user apparatus. The second user apparatus sends data to an effect that the second user accepts the invitation with the viewing right irrespective of whether or not the second user has the viewing right to the video. The instruction issuing section performs a process of causing the second user apparatus to initiate display of the video synchronously with causing the information processing apparatus to initiate the display of the video in a case where the data to the effect that the second user has accepted the invitation with the viewing right is received from the second user apparatus.

According to still another embodiment of the present disclosure, there is provided a video display method that is carried out by an apparatus of a first user having a viewing right to a given video. The video display method includes a step of sending an invitation for viewing of the video to a second user apparatus and an instruction issuing step. The second user apparatus sends data to an effect that the second user accepts the invitation in a case where the second user has a viewing right to the video. The instruction issuing step performs a process of causing the second user apparatus to initiate display of the video synchronously with causing the first user apparatus to initiate the display of the video in a case where the data to the effect that the second user has accepted the invitation is received from the second user apparatus.

According to still another embodiment of the present disclosure, there is provided a video display method that is carried out by an apparatus of a first user having a viewing right to a given video. The video display method includes a step of sending an invitation for viewing of the video with the viewing right to a second user apparatus and an instruction issuing step. The second user apparatus sends data to an effect that the second user accepts the invitation with the viewing right irrespective of whether or not the second user has the viewing right to the video. The instruction issuing section performs a process of causing the second user apparatus to initiate display of the video synchronously with causing the first user apparatus to initiate the display of the video in a case where the data to the effect that the second user has accepted the invitation with the viewing right is received from the second user apparatus.

It should be noted that arbitrary combinations of the above components and conversions of expressions of the present disclosure between an apparatus, a computer program, recording media having the computer program recorded therein in a readable manner, and so on are also effective as modes of the present disclosure.

The present disclosure can provide an innovative viewing experience to viewers watching a video.

DETAILED DESCRIPTION OF THE PREFERRED EMBODIMENTS

First Embodiment

An entertainment system 1 of a first embodiment causes a video to be reproduced and displayed on a movie screen provided in a virtual space and causes a virtual reality picture (hereinafter, also referred to as a "VR image") including the movie screen to be displayed on a head-mounted display (hereinafter, also referred to as an "HMD") of a user. The entertainment system 1 of the first embodiment provides a "Watch Together" viewing experience to a plurality of viewers in a manner similar to viewing a video in a real-life movie theater.

Further, the entertainment system 1 of the first embodiment causes a second user apparatus to initiate the display of a video synchronously with causing a first user apparatus to initiate the display of the video in the case where both the first and second users have a viewing right to the video and in the case where the second user accepts an invitation from the first user.

Figure 1:
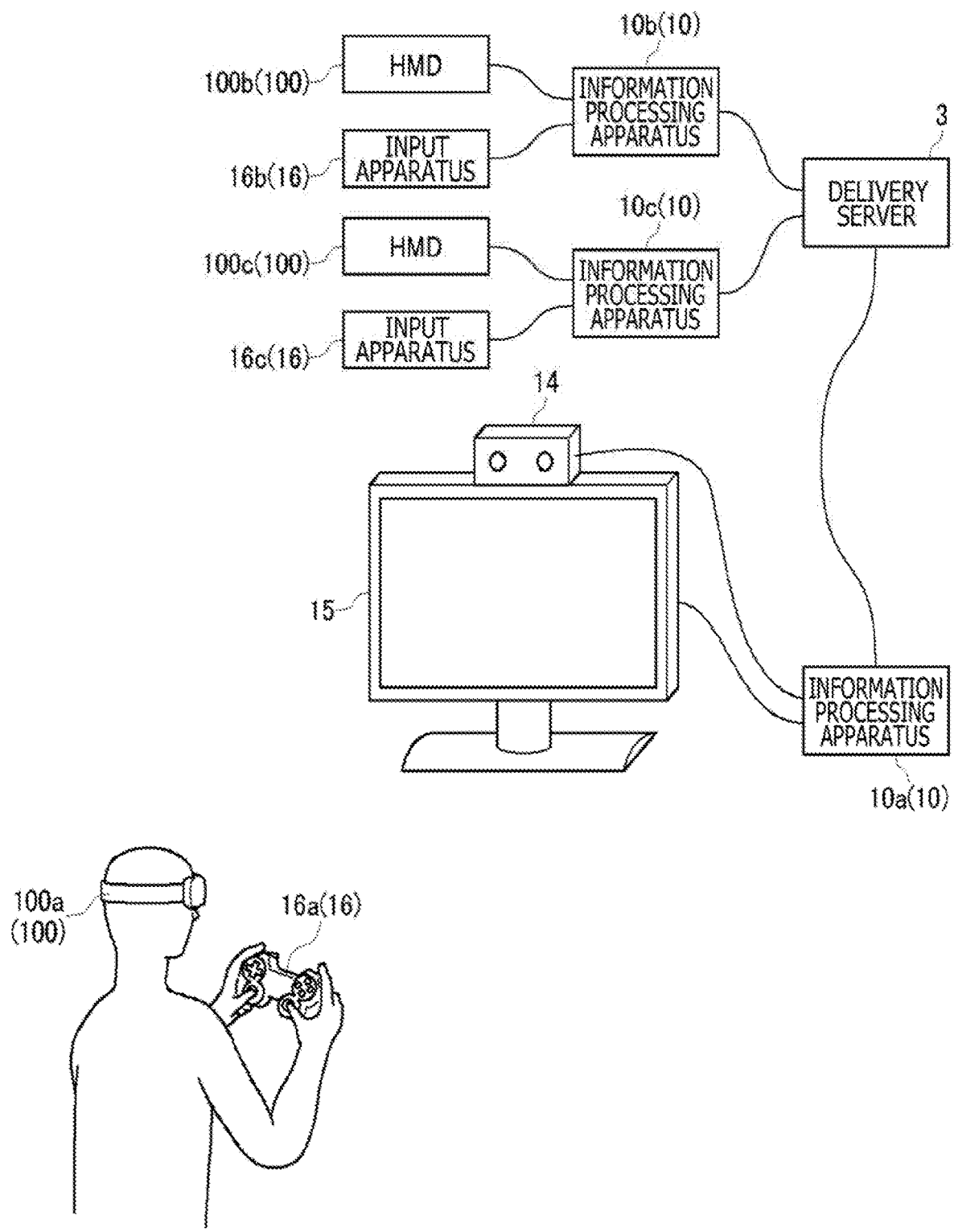
FIG. 1 is a diagram illustrating a configuration of an entertainment system of a first embodiment.

FIG. 1 illustrates a configuration of the entertainment system 1 of the first embodiment. The entertainment system 1 is an information processing system designed for video viewing by users and includes video delivery and video display functions.

The entertainment system 1 includes an information processing apparatus 10a, an information processing apparatus 10b, and an information processing apparatus 10c (collectively referred to as "information processing apparatuses 10"), an HMD 100a, an HMD 100b, and an HMD 100c (collectively referred to as "HMDs 100"), and an input apparatus 16a, an input apparatus 16b, and an input apparatus 16c (collectively referred to as "input apparatuses 16").

Each of the information processing apparatuses 10 performs various data processing tasks for causing one of the HMDs 100 to display a VR image depicting a virtual movie theater. The information processing apparatuses 10 may each be a PC or a gaming console. Each of the input apparatuses 16 is a controller for inputting manipulation to the information processing apparatus 10.

The information processing apparatus 10a, the HMD 100a, and the input apparatus 16a are used by a first user. The information processing apparatus 10b, the HMD 100b, and the input apparatus 16b are used by a second user. The information processing apparatus 10c, the HMD 100c, and the input apparatus 16c are used by a third user.

In each user's environment, an imaging apparatus 14 and an output apparatus 15 are further provided. The output apparatus 15 is a television or a monitor for displaying an image. The imaging apparatus 14 is a camera apparatus for imaging the user wearing the HMD 100 at given intervals. The imaging apparatus 14 is a stereo camera and supplies a captured image to the information processing apparatus 10. Although described later, the HMD 100 has markers (tracking light-emitting diodes (LEDs)) for tracking a user's head, and the information processing apparatus 10 detects a motion (e.g., position, posture, and changes thereto) of the HMD 100 on the basis of markers' positions included in the captured image.

It should be noted that the HMD 100 incorporates a posture sensor (acceleration sensor and gyro sensor) and that the information processing apparatus 10 carries out a highly accurate tracking process by acquiring sensor data detected by the posture sensor from the HMD 100 and using captured images of the markers at the same time. It should be noted that a variety of techniques have been proposed to date for the tracking process and that any tracking technique may be used as long as the motion of the HMD 100 can be detected by the information processing apparatus 10.

Because the user watches an image with the HMD 100, the output apparatus 15 is not typically necessary for the user wearing the HMD 100. However, other user can watch the image displayed on the output apparatus 15 by making available the output apparatus 15. The information processing apparatus 10 may cause the output apparatus 15 to display the same image as watched by the user wearing the HMD 100. Alternatively, the information processing apparatus 10 may cause the output apparatus 15 to display a different image. For example, in the case where the user wearing the HMD 100 and the other user (e.g., a friend) view the same picture content together, the output apparatus 15 may display picture content as seen from other user's viewpoint.

The information processing apparatus 10a, the information processing apparatus 10b, and the information processing apparatus 10c communicate with a delivery server 3 on an external network by using a given communication protocol. The delivery server 3 delivers video data to the information processing apparatus 10a, the information processing apparatus 10b, and the information processing apparatus 10c in accordance with a given streaming protocol. A video to be delivered may be, for example, a movie, an animation, a concert, or a game picture. On the other hand, a video to be delivered may be a monoscopic picture (in other words, a two-dimensional picture) or a stereoscopic picture (in other words, a three-dimensional picture) having parallax to permit stereoscopic viewing.

Figure 2:
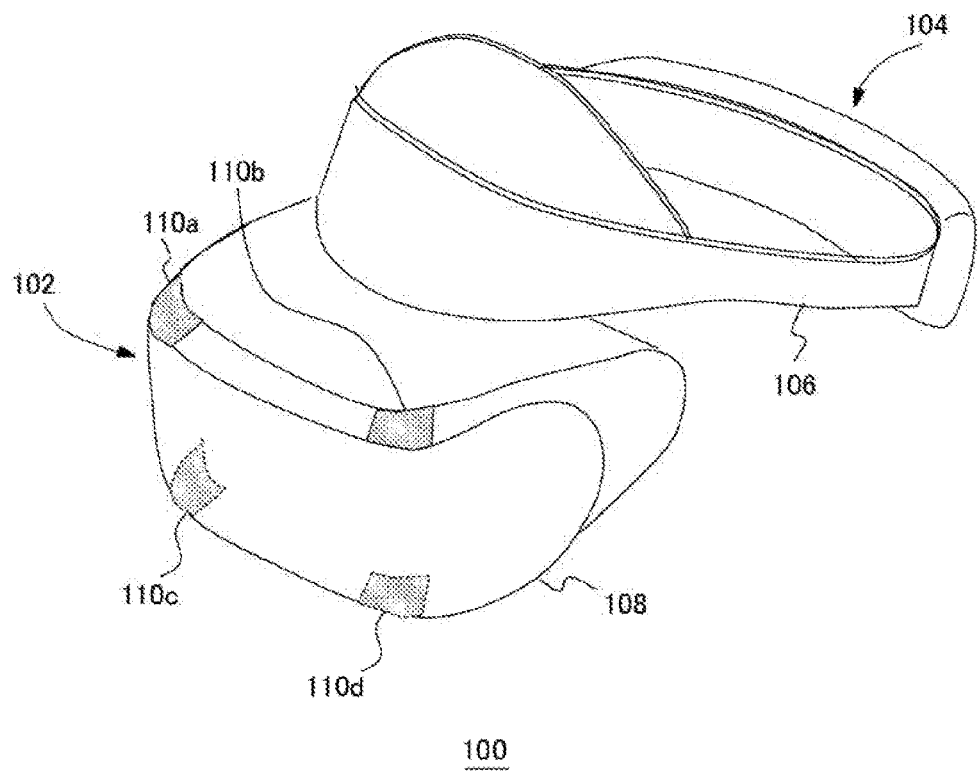
FIG. 2 is a diagram illustrating an appearance and shape of an HMD illustrated in FIG. 1.

FIG. 2 is a diagram illustrating an appearance and shape of the HMD 100 illustrated in FIG. 1. The HMD 100 includes an output mechanism section 102 and a fitting mechanism section 104. The fitting mechanism section 104 includes a fitting band 106 that fastens the HMD 100 to the user's head by going around the user's head when worn by the user. The fitting band 106 has a raw material or a structure that permits adjustment of its length in accordance with a user's head circumference.

The output mechanism section 102 includes a housing 108 shaped to cover user's left and right eyes when the HMD 100 is worn by the user and incorporates therein a display panel that is opposed to the eyes when the HMD 100 is worn. The display panel may be a liquid crystal panel, an organic electroluminescence (EL) panel, or other type of panel. The housing 108 further includes, therein, a pair of left and right optical lenses, located between the display panel and the user's eyes, for expanding a user's viewing angle. The HMD 100 may further include a speaker or an earphone at a position corresponding to a user's ear and be configured such that an external headphone is connected.

The housing 108 includes, on its outer surface, light-emitting markers 110a, 110b, 110c, and 110d. Although, in this example, tracking LEDs are included in the light-emitting markers 110, the other types of markers may also be used. In any case, any type of markers may be used as long as they can be imaged with the imaging apparatus 14 and their positions can be subjected to image analysis. Although there are no particular limitations on the number and layout of the light-emitting markers 110, the light-emitting markers 110 are typically provided in quantity and layout to permit detection of the posture of the HMD 100. In the example illustrated, the light-emitting markers 110 are provided at four corners on the front of the housing 108. Further, the light-emitting markers 110 may be provided on side or rear portions of the fitting band 106 to permit imaging even when the user turns his or her back on the imaging apparatus 14.

The HMD 100 may be connected to the information processing apparatus 10 with a cable or with a known wireless communication protocol. The HMD 100 not only sends sensor data detected by the posture senor to the information processing apparatus 10 but also receives image data generated by the information processing apparatus 10 and causes the left eye display panel and the right eye display panel to display the image data.

Figure 3:
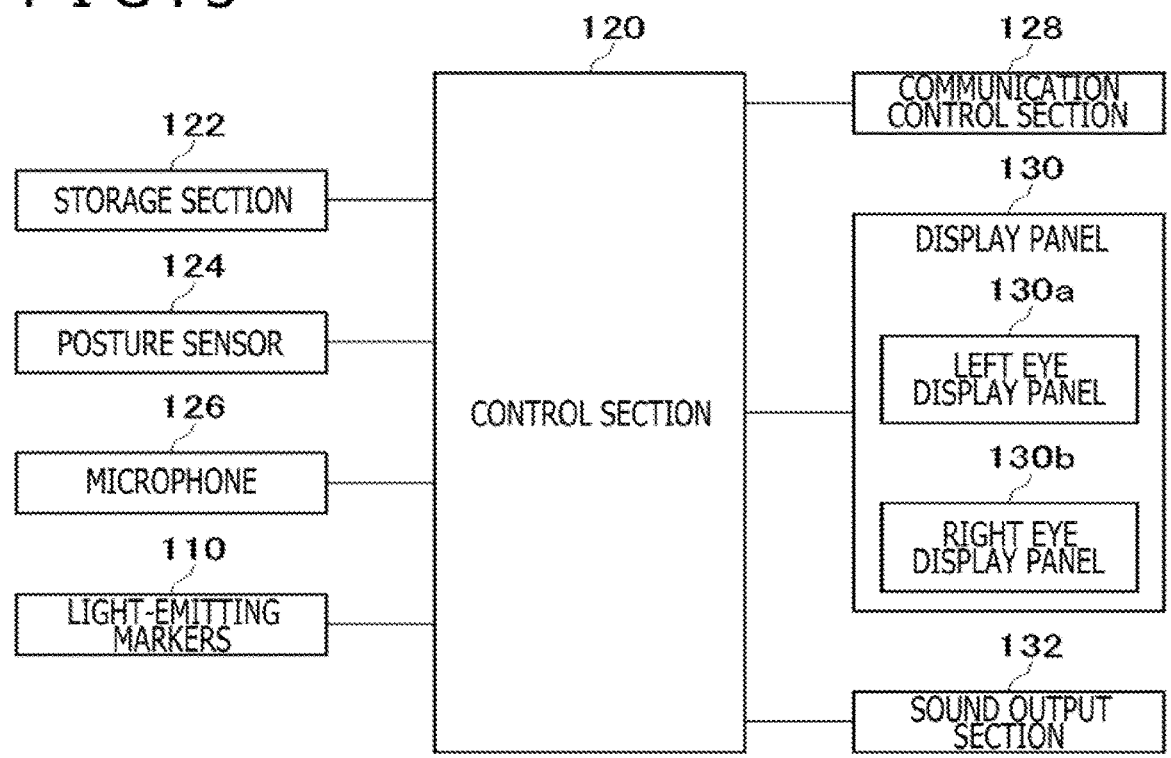
FIG. 3 is a block diagram illustrating functional blocks of the HMD illustrated in FIG. 1.

FIG. 3 is a block diagram illustrating functional blocks of the HMD 100 illustrated in FIG. 1. A plurality of functional blocks depicted in the block diagrams of the present specification can include, in terms of hardware, circuit blocks, a memory, and other large-scale integrations (LSIs), and be realized, in terms of software, by execution of a program loaded into the memory by a central processing unit (CPU). Therefore, it is to be understood by those skilled in the art that these functional blocks can be realized in a variety of ways by hardware alone, by software alone, or by a combination thereof and that the manner in which they are realized is not limited to any one of them.

A control section 120 is a main processor that processes various pieces of image data, sound data, and sensor data and instructions and outputs processing results. A storage section 122 temporarily stores data, instructions, and so on to be processed by the control section 120. A posture sensor 124 detects posture information of the HMD 100. The posture sensor 124 includes at least a triaxial acceleration sensor and a triaxial gyro sensor.

A communication control section 128 sends data output from the control section 120 to the external information processing apparatus 10 through wired or wireless communication via a network adapter or an antenna. The communication control section 128 also receives data from the information processing apparatus 10 through wired or wireless communication and outputs the data to the control section 120.

When image and sound data is received from the information processing apparatus 10, the control section 120 supplies the image data to a display panel 130 for display of the image and supplies the sound data to a sound output section 132 for production of the sound. The display panel 130 includes a left eye display panel 130a and a right eye display panel 130b. The control section 120 causes each display panel to display a pair of parallax images. That is, the control section 120 causes the left eye display panel 130a to display a left eye image sent from the information processing apparatus 10 and the right eye display panel 130b to display a right eye image sent from the information processing apparatus 10. The control section 120 also causes the communication control section 128 to send sensor data from the posture sensor 124 and sound data from a microphone 126 to the information processing apparatus 10.

Figure 4:
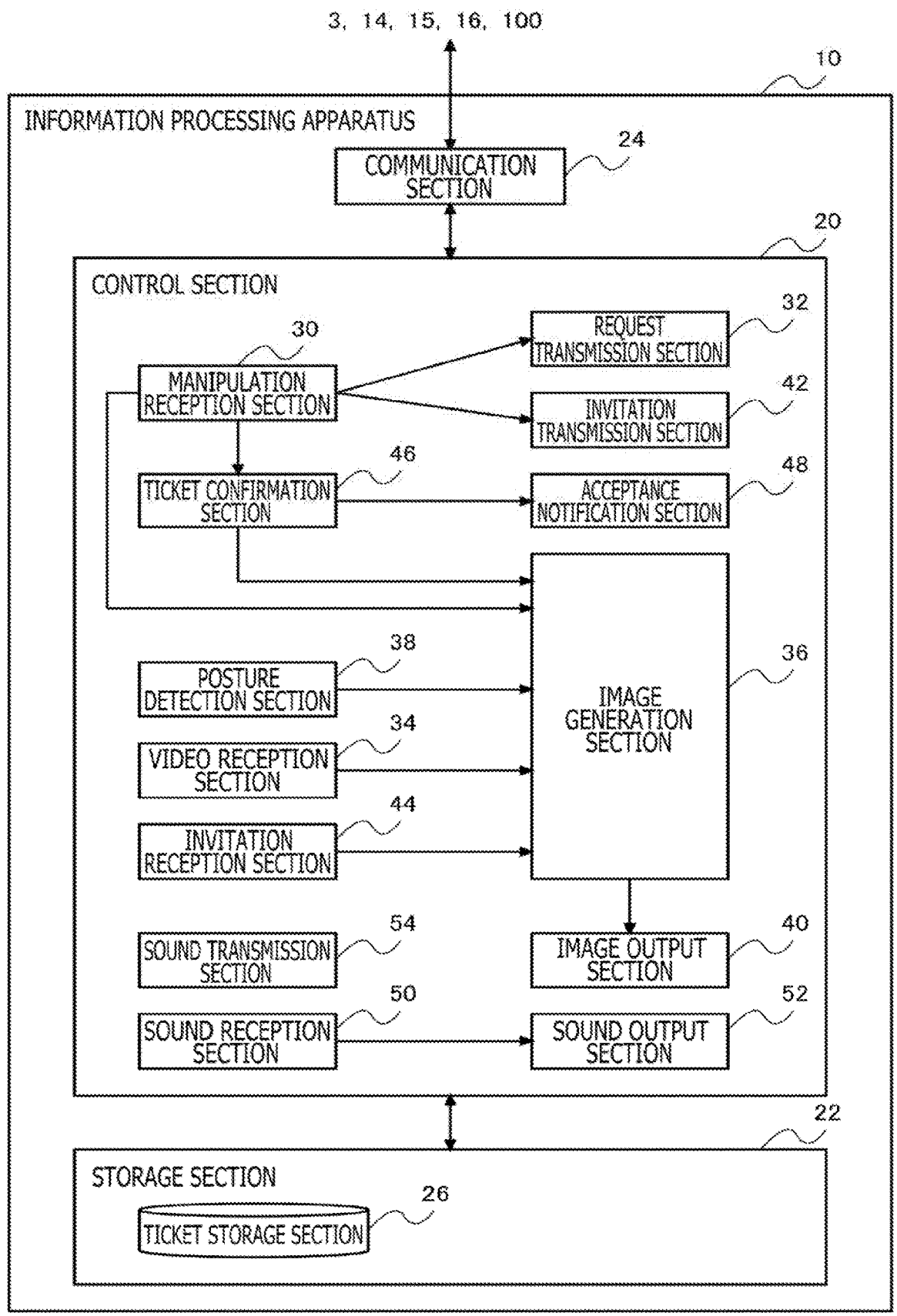
FIG. 4 is a block diagram illustrating functional blocks of an information processing apparatus illustrated in FIG. 1.

FIG. 4 is a block diagram illustrating functional blocks of the information processing apparatus 10 illustrated in FIG. 1. The functional blocks illustrated in FIG. 4 are common to the information processing apparatus 10a, the information processing apparatus 10b, and the information processing apparatus 10c. The information processing apparatus 10 includes a control section 20, a storage section 22, and a communication section 24. The control section 20 performs various data processing tasks. The storage section 22 stores data to be referred to or updated by the control section 20. The communication section 24 communicates with external apparatuses in accordance with a given communication protocol. The control section 20 sends and receives data to and from the delivery server 3, the imaging apparatus 14, the output apparatus 15, the input apparatus 16, and the HMD 100 via the communication section 24.

The storage section 22 includes a ticket storage section 26. The ticket storage section 26 stores information regarding a video ticket (i.e., viewing right) purchased by the user. Information regarding a ticket includes identification information (e.g., ID and title) of a video allowed to be viewed by the user (in other words, video having a viewing right) and the number of tickets.

The control section 20 includes a manipulation reception section 30, a request transmission section 32, a video reception section 34, an image generation section 36, a posture detection section 38, an image output section 40, an invitation transmission section 42, an invitation reception section 44, a ticket confirmation section 46, an acceptance notification section 48, a sound reception section 50, a sound output section 52, and a sound transmission section 54.

At least some of the functional blocks of the control section 20 may be implemented as modules of a computer program (an application for viewing a video in the embodiment and will be hereinafter referred to as a "theater App"). The theater App may be stored in a recording media such as a digital versatile disc (DVD) or downloaded from a network and installed to the storage section 22. The CPU and a graphics processing unit (GPU) of the information processing apparatus 10 may provide the function of each of the functional blocks by loading the theater App into the main memory and executing the theater App. On the other hand, at least some of the functional blocks of the control section 20 may be realized by basic functions (in other words, system functions) of the information processing apparatus 10.

The manipulation reception section 30 receives a signal sent from the input apparatus 16 and detects the manipulation input by the user to the input apparatus 16 on the basis of the signal. The request transmission section 32 delivers a variety of requests (e.g., video delivery request) to the delivery server 3 in response to the user manipulation detected by the manipulation reception section 30.

The video reception section 34 receives video data sent from the delivery server 3 and hands the data over to the image generation section 36. The image generation section 36 generates a VR image (i.e., display image to be displayed on the HMD 100) whose video is reproduced and displayed on a movie screen provided in a virtual space (virtual movie theater in the embodiment) on the basis of video data received by the video reception section 34. The image output section 40 outputs VR image data, generated by the image generation section 36, to the HMD 100 and causes the display panel 130 of the HMD 100 to display the VR image.

The posture detection section 38 detects the position and posture of the HMD 100 on the basis of a captured image output from the imaging apparatus 14 and posture information output from the posture sensor 124 of the HMD 100 by using a known head tracking technique. The posture detection section 38 may also further identify the direction of the line of sight of the user wearing the HMD 100 on the basis of the position and posture of the HMD 100. The image generation section 36 generates a VR image whose details match the position and posture of the HMD 100 detected by the posture detection section 38, i.e., whose details match the user's line of sight.

The invitation transmission section 42 sends, to the information processing apparatus 10 of the other user specified by the user, invitation data whose details encourage the other user to view the same video together in response to the user's manipulation. The invitation data includes information regarding the video to be viewed and includes, for example, an ID, a title, description, and other information of the video to be viewed.

The invitation reception section 44 receives invitation data sent from the information processing apparatus 10 of the other user. The image generation section 36 generates a VR image depicting the details of the invitation data sent from the information processing apparatus 10 of the other user.

The ticket confirmation section 46 confirms whether or not the user has a ticket of the video (in other words, a viewing right to the video) indicated by the invitation by referring to the ticket storage section 26 in the case where user manipulation signifying the acceptance of the invitation is received. The image generation section 36 generates a VR image of the theater App and generates a VR image whose details correspond to whether or not the user has a ticket of the video indicated by the invitation in the case where user manipulation signifying the acceptance of the invitation is received.

The acceptance notification section 48 sends, to the information processing apparatus 10 of the other user, the sender of the invitation, data to the effect that the invitation will be accepted (hereinafter, also referred to as "acceptance data") in the case where user manipulation signifying the acceptance of the invitation is received. It can also be said that acceptance data indicates that the user will join viewing of the video indicated by the invitation. In the first embodiment, the acceptance notification section 48 can send acceptance data in the case where the user of its own information processing apparatus has a ticket of the video indicated by the invitation.

Although described in detail later, the request transmission section 32 includes a function of an instruction issuing section to cause the other information processing apparatus to initiate the display of a video synchronously with causing the own information processing apparatus to initiate the display of the same video in the case where acceptance data is received from the other information processing apparatus.

The request transmission section 32 of the first embodiment sends, to the delivery server 3, data requesting the delivery of the video to the own information processing apparatus and the other information processing apparatus by using the ticket possessed by the user of the own information processing apparatus and the ticket possessed by the user of the other information processing apparatus.

The sound reception section 50 receives sound data (i.e., sound produced by the other user) sent from the information processing apparatus 10 of a voice chat partner. The sound output section 52 sends the sound data received by the sound reception section 50 to the HMD 100 and causes the sound output section 132 to output the sound data. The sound transmission section 54 sends sound data (i.e., sound produced by the user) input from the HMD 100 to the information processing apparatus 10 of the voice chat partner.

Figure 5:
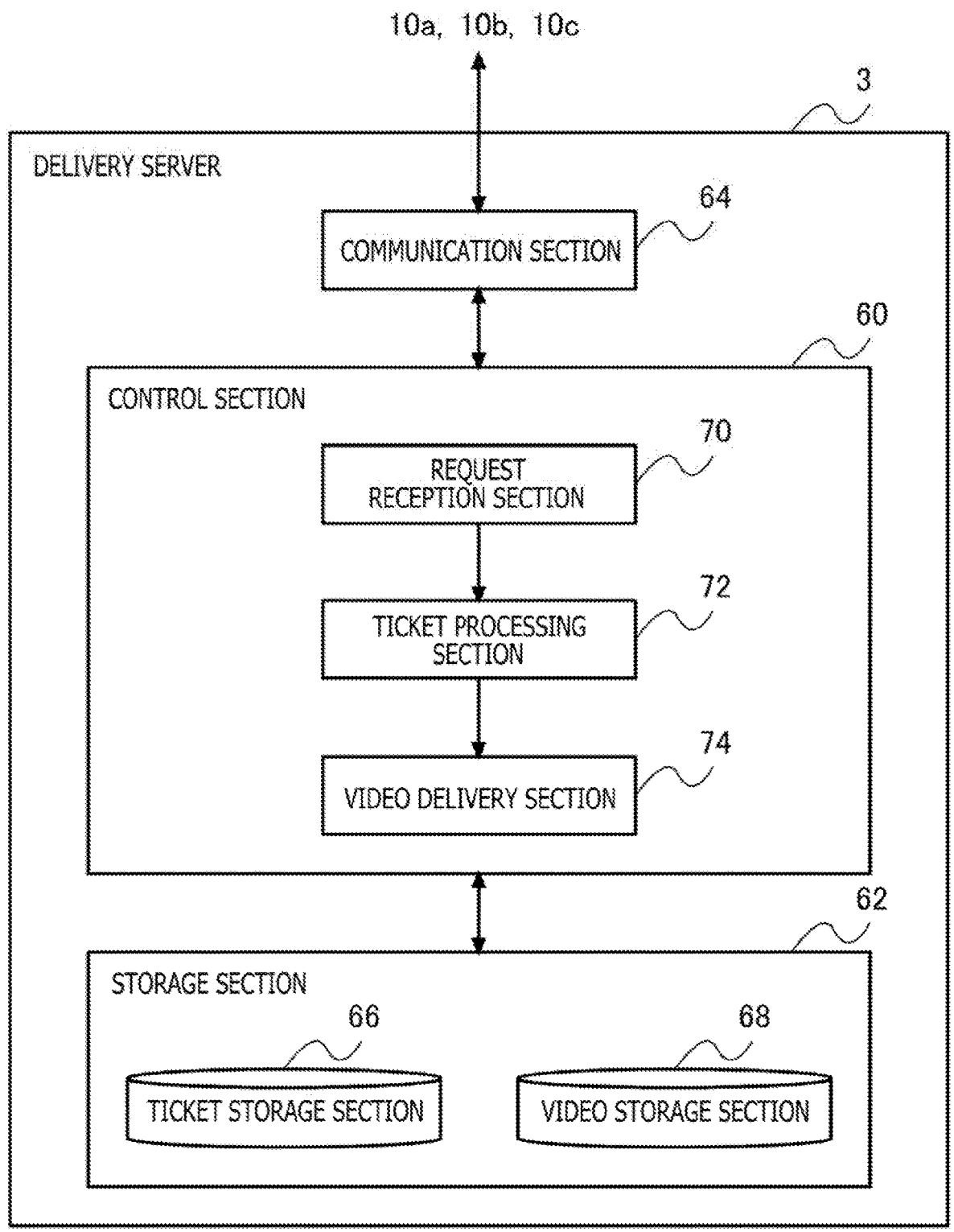
FIG. 5 is a block diagram illustrating functional blocks of a delivery server illustrated in FIG. 1.

FIG. 5 is a block diagram illustrating functional blocks of the delivery server 3 illustrated in FIG. 1. The delivery server 3 includes a control section 60, a storage section 62, and a communication section 64. The control section 60 performs various data processing tasks associated with delivery of video data. The storage section 62 stores data to be referred to or updated by the control section 60. The communication section 64 communicates with external apparatuses in accordance with a given communication protocol. The control section 60 sends and receives data to and from the information processing apparatus 10a, the information processing apparatus 10b, and the information processing apparatus 10c via the communication section 64.

The storage section 62 includes a ticket storage section 66 and a video storage section 68. The ticket storage section 66 stores information regarding a video ticket (i.e., viewing right) purchased by each of a plurality of users. In the embodiment, ticket information of each user stored in the ticket storage section 66 is synchronized with ticket information stored in the ticket storage section 26 of the information processing apparatus 10 of each user. The video storage section 68 stores a plurality of pieces of video data equal in number to the number of titles that can be delivered to the information processing apparatuses 10.

The control section 60 includes a request reception section 70, a ticket processing section 72, and a video delivery section 74. The request reception section 70 receives a video delivery request sent from the information processing apparatus 10 of each user. The video delivery request includes identification information of the video specified as a video to be delivered.

The ticket processing section 72 refers to the ticket storage section 66 and confirms whether or not the requesting user has already purchased a ticket of the video to be delivered that has been specified by the request in the case where the video delivery request is received by the request reception section 70. The video delivery section 74 sends, to the information processing apparatus 10 of the requesting user, the data of the video to be delivered that is stored in the video storage section 68 in the case where the requesting user has already purchased a ticket of the video to be delivered.

A description will be given of operation of the entertainment system 1 of the first embodiment configured as described above.

Figure 6:
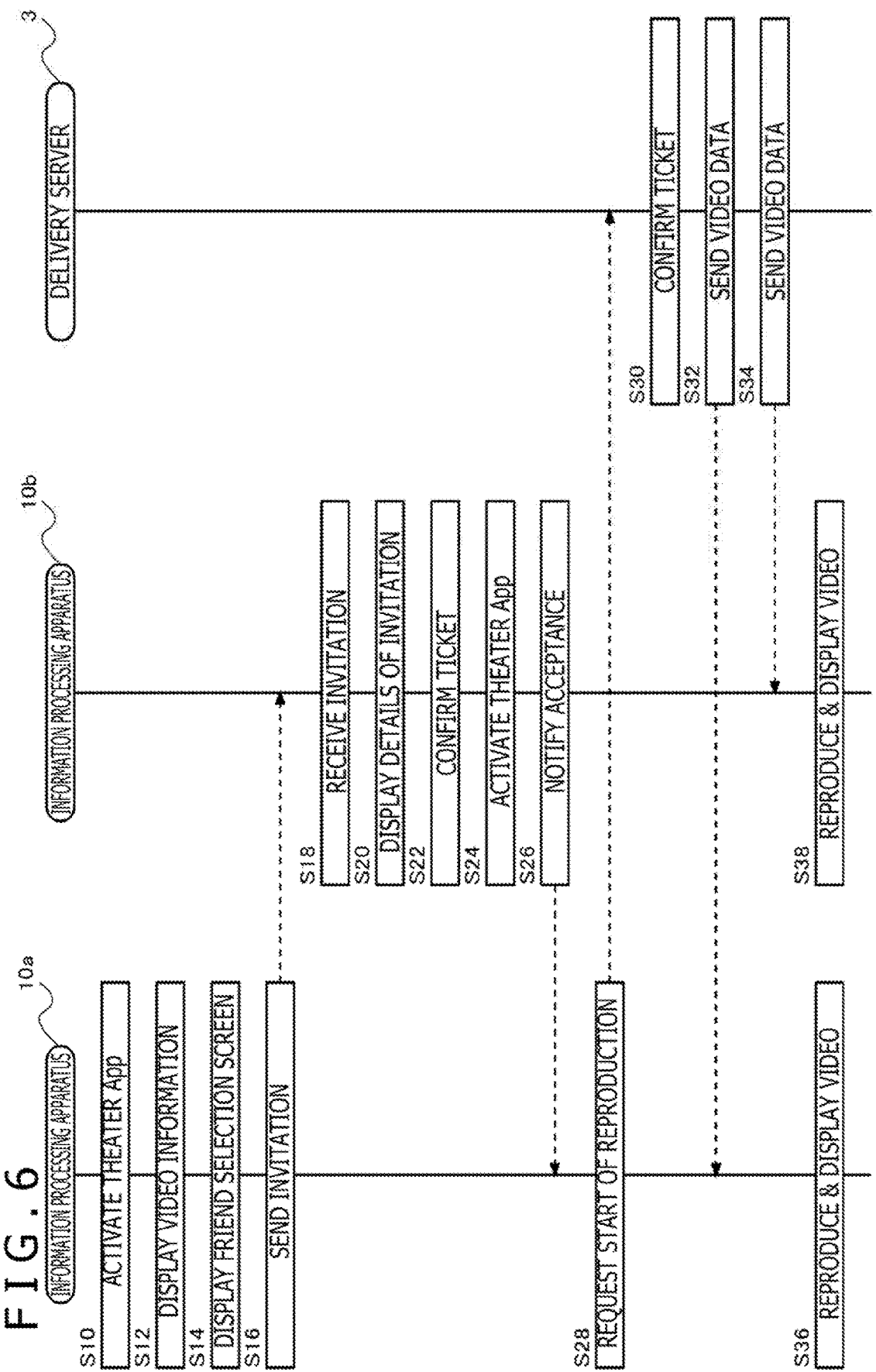
FIG. 6 is a diagram illustrating operation of the entertainment system of the first embodiment.

FIG. 6 is a diagram illustrating operation of the entertainment system 1 of the first embodiment. FIG. 6 illustrates operation in the case where the first user manipulating the information processing apparatus 10a invites the second user manipulating the information processing apparatus 10b for video viewing and the first and second users watch the same video at the same time. In the first embodiment, a typical condition is that both the first and second users have purchased a ticket of the video in question for simultaneous viewing of the same video.

The first user activates the theater App on the information processing apparatus 10a (S10). The image generation section 36 of the information processing apparatus 10a generates data of a theater App screen, and the image output section 40 causes the HMD 100a to display the theater App screen. The manipulation reception section 30 receives manipulation of the first user specifying a specific video. The specific video is a video to be viewed together with the second user and will be hereinafter referred to as "target video." In the first embodiment, it is assumed that the first user has already purchased a ticket of the target video.

Figure 7:
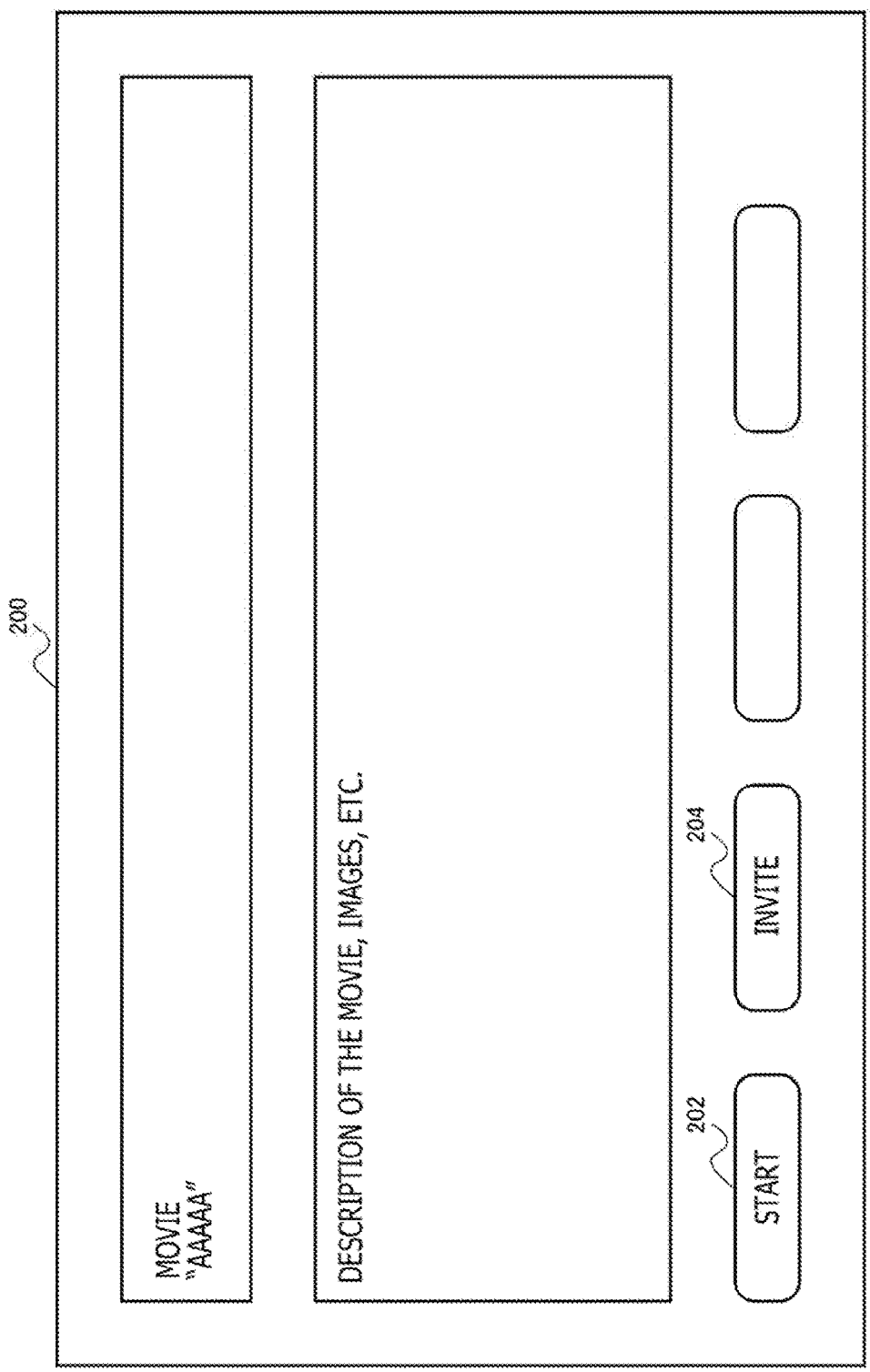
FIG. 7 is a diagram illustrating an example of a theater App screen.

FIG. 7 illustrates an example of the theater App screen displayed in the case where the first user specifies a target video. As illustrated in FIG. 7, the image generation section 36 generates data of a theater App screen 200 including information regarding the target video (e.g., title, description, images) (S12). The image generation section 36 arranges a start icon 202 and an invite icon 204 on the theater App screen 200 that includes information regarding the target video.

Figure 8:
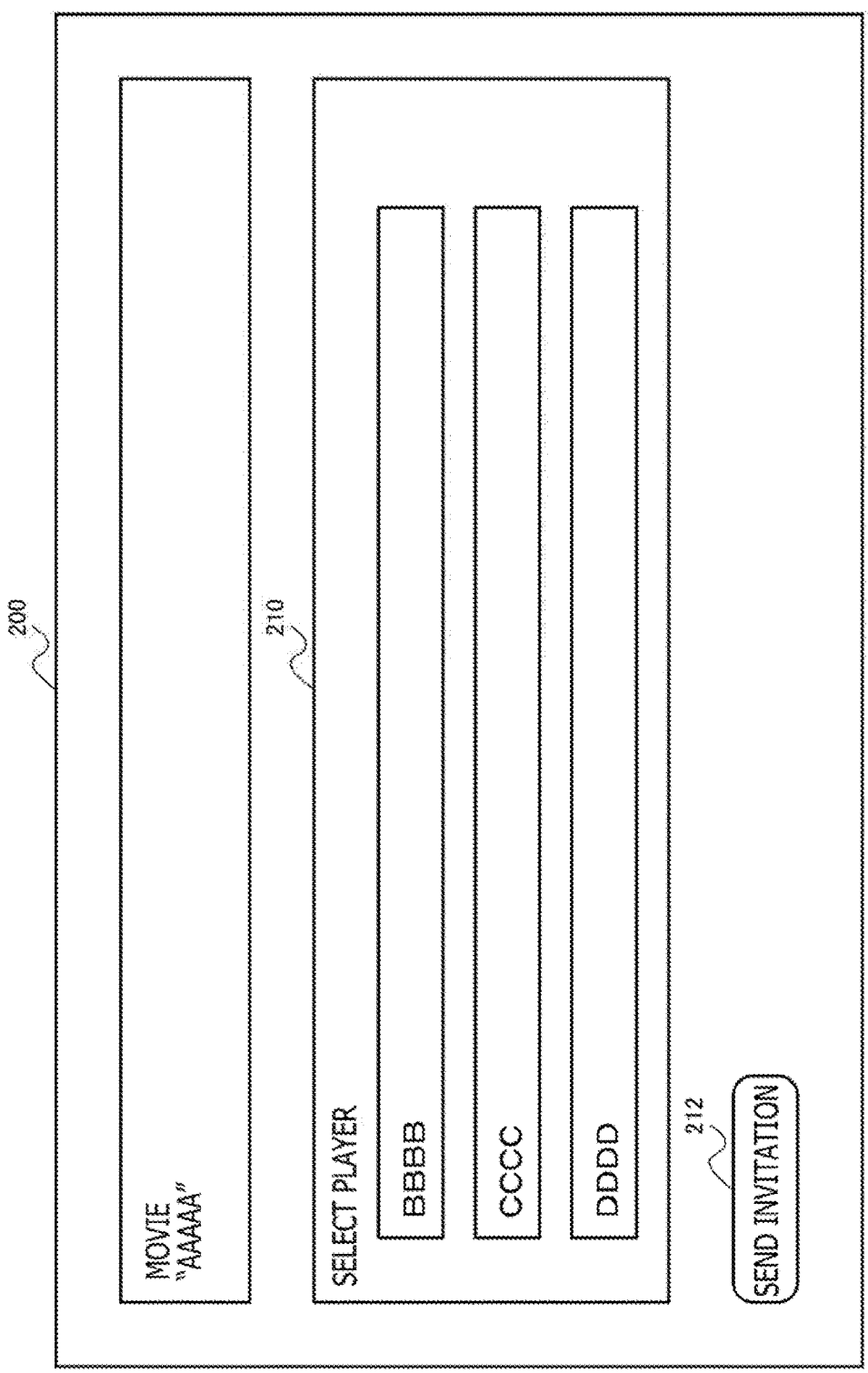
FIG. 8 is a diagram illustrating an example of a theater App screen.

Referring back to FIG. 6, the manipulation reception section 30 receives manipulation of the first user selecting the invite icon 204 on the theater App screen 200. The image generation section 36 generates data of a friend selection screen for causing the first user to select a player with whom to watch the video from among friends registered in advance by the first user. The image output section 40 causes the HMD 100a to display the friend selection screen (S14). FIG. 8 also illustrates an example of the theater App screen. The theater App screen 200 in FIG. 8 depicts a friend selection screen. The friend selection screen includes a player selection area 210 for selecting a friend to be invited for video viewing and a send icon 212.

Referring back to FIG. 6, the manipulation reception section 30 selects a specific friend (second user here) in the player selection area 210 in FIG. 8 first and then receives manipulation of the first user selecting the send icon 212. The invitation transmission section 42 sends, to the information processing apparatus 10b of the second user selected in the player selection area 210, invitation data to the effect that the second user has been invited for viewing of the target video (S16).

Figure 9:
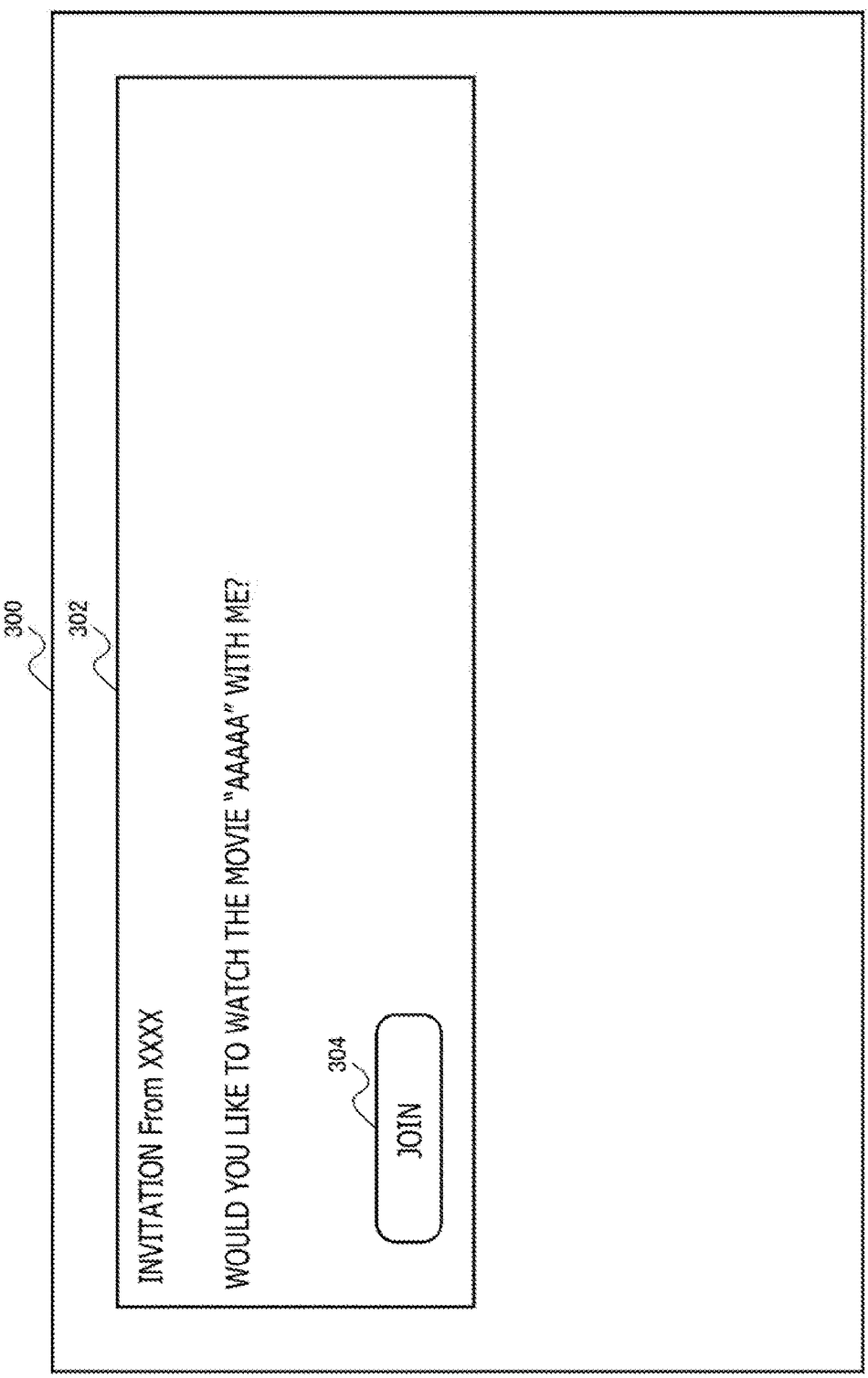
FIG. 9 is a diagram illustrating an example of a system screen displaying an invitation.

The invitation reception section 44 of the information processing apparatus 10b receives invitation data sent from the information processing apparatus 10a (S18). In the embodiment, the invitation is sent and received by using a notification function provided by a known online service. The image generation section 36 generates an invitation card image including details of the invitation, and the image output section 40 causes the HMD 100 to display the invitation card image (S20). In the embodiment, the invitation is displayed by using system functions of the information processing apparatuses 10. FIG. 9 illustrates an example of a system screen displaying the invitation. The image generation section 36 generates a system screen 300 including an invitation card image 302. Information regarding the target video, a message from the first user, and a join icon 304 are arranged on the invitation card image 302.

The second user selects the join icon 304 on the invitation card image 302 illustrated in FIG. 9 in the case where the second user accepts the invitation from the first user. Referring back to FIG. 6, the manipulation reception section 30 receives manipulation of the second user selecting the join icon 304. The ticket confirmation section 46 confirms whether a ticket of the target video is stored in the ticket storage section 26 of the information processing apparatus 10b, i.e., confirms whether or not the second user has already purchased a ticket of the target video (S22). Here, it is assumed that the fact that the ticket storage section 26 stores a ticket of the target video has been confirmed.

When manipulation of the second user selecting the join icon 304 is received, the system of the information processing apparatus 10b activates the theater App installed in the information processing apparatus 10b (S24). On the other hand, in the case where manipulation of the second user selecting the join icon 304 is received and the fact that the ticket storage section 26 stores a ticket of the target video has been confirmed, the acceptance notification section 48 of the information processing apparatus 10b sends, to the information processing apparatus 10a, acceptance data indicating the acceptance of the invitation (S26).

It should be noted that in the case where the ticket storage section 26 does not store any ticket of the target video, that is, the second user has yet to purchase a ticket of the target video, the acceptance notification section 48 may refrain from sending acceptance data even if manipulation of the second user selecting the join icon 304 is received. In that case, the image generation section 36 of the information processing apparatus 10b may set the join icon 304 to an unselectable state (in other words, an inactive state) and display a message to the effect that the second user is not allowed to watch the video because he or she has yet to purchase a ticket.

The image generation section 36 of the information processing apparatus 10a displays, on the theater App screen 200 illustrated in FIG. 7, a message to the effect that the invitation has been accepted. When the invitation is accepted, the first user selects the start icon 202 on the theater App screen 200. The manipulation reception section 30 receives manipulation of the first user selecting the start icon 202. The request transmission section 32 sends, to the delivery server 3, delivery request data requesting the delivery of the video (S28). The delivery request data includes identification information (e.g., ID) of the target video and identification information of the viewer (in other words, delivery destination). Identification information of the viewer further includes an ID of the first user or an ID of the information processing apparatus 10a and further includes an ID of the second user or an ID of the information processing apparatus 10b.

The request reception section 70 of the delivery server 3 receives the delivery request data sent from the information processing apparatus 10a. The ticket processing section 72 confirms whether or not each of one or more of the viewers indicated by the delivery request data has already purchased a ticket of the target video. In the example illustrated in FIG. 6, the ticket processing section 72 confirms whether both the first and second users have already purchased a ticket of the target video (S30). Here, it is assumed that the ticket processing section 72 has confirmed that both the first and second users had already purchased a ticket of the target video.

The video delivery section 74 initiates streaming delivery of the target video data to the information processing apparatus 10a (S32) and, in parallel, initiates streaming delivery of the target video data to the information processing apparatus 10b (S34). It should be noted that if at least one of the first and second users has yet to purchase a ticket of the target video, the video delivery section 74 may reject both the delivery of the target video data to the information processing apparatus 10a and the delivery of the target video data to the information processing apparatus 10b. Alternatively, the video delivery section 74 may deliver, of the viewers indicated by the delivery request data, the target video data to the information processing apparatus 10 of the user who has already purchased a ticket and reject the delivery of the target video data to the information processing apparatus 10 of the user who has yet to purchase a ticket.

The video reception section 34 of the information processing apparatus 10a receives the target video data sent from the delivery server 3, and the image generation section 36 of the information processing apparatus 10a generates the theater App screen 200 on which the target video will be reproduced and displayed and causes the HMD 100a to display the theater App screen 200 (S36). The video reception section 34 of the information processing apparatus 10b also receives the target video data sent from the delivery server 3, and the image generation section 36 of the information processing apparatus 10b generates the theater App screen 200 on which the target video will be reproduced and displayed and causes the HMD 100b to display the theater App screen 200 (S38).

The video delivery section 74 of the delivery server 3, the image generation section 36 of the information processing apparatus 10a, and the image generation section 36 of the information processing apparatus 10b function as a display control section that causes the information processing apparatus 10b to initiate the display of the target video synchronously with causing the information processing apparatus 10a to initiate the display of the target video by working in coordination with each other. That is, it is controlled such that an elapsed time from the start of the reproduction of the target video on the information processing apparatus 10a is synchronized with an elapsed time from the start of the reproduction of the target video on the information processing apparatus 10b, thus allowing the first and second users to view the same details of the video at the same time. The synchronization of the reproduction and display of a video between a plurality of apparatuses may be realized by a known technique.

Figure 10:
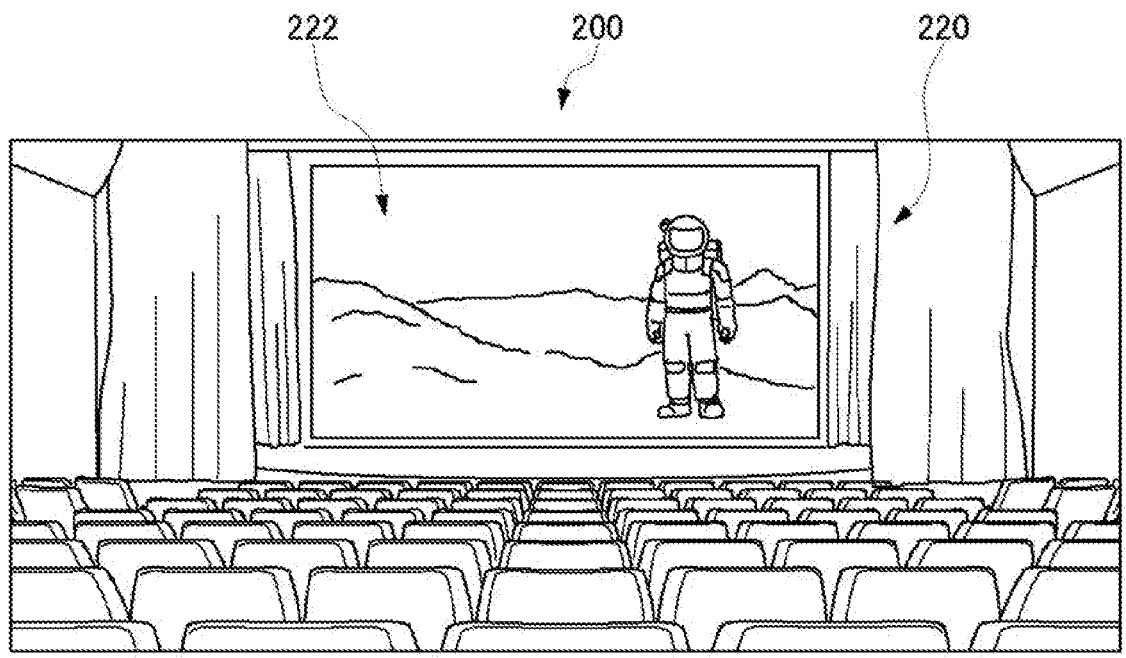
FIG. 10 is a diagram illustrating an example of a theater App screen.

FIG. 10 illustrates an example of the theater App screen 200. FIG. 10 illustrates the theater App screen 200 on which the target video is reproduced. The image generation section 36 of the information processing apparatus 10a and the image generation section 36 of the information processing apparatus 10b generate the theater App screen 200 on which a virtual movie screen 222 is arranged in a theater room 220 that depicts a virtual movie theater. The image generation sections 36 perform a process of reproducing the target video and sets reproduction results of the target video on the movie screen 222. This provides, to the first user wearing the HMD 100a and the second user wearing the HMD 100b, a viewing experience that makes the two users feel as if they are viewing the same video at the same time in the same movie theater.

It should be noted that voice chat preferably takes place between the information processing apparatus 10a and the information processing apparatus 10b while the target video is reproduced and displayed. This allows the first and second users to more intensely perceive a sensation of viewing the same video at the same time in the same movie theater.

S22 of FIG. 6 describes operation in the case where the ticket confirmation section 46 of the information processing apparatus 10b confirms that no ticket of the target video is stored in the ticket storage section 26, that is, in the case where the second user has yet to purchase a ticket of the target video. In this case, the image generation section 36 of the information processing apparatus 10b generates a theater App screen including content for purchasing a ticket of the target video, and the image output section 40 causes the HMD 100b to display the theater App screen.

Figure 11:
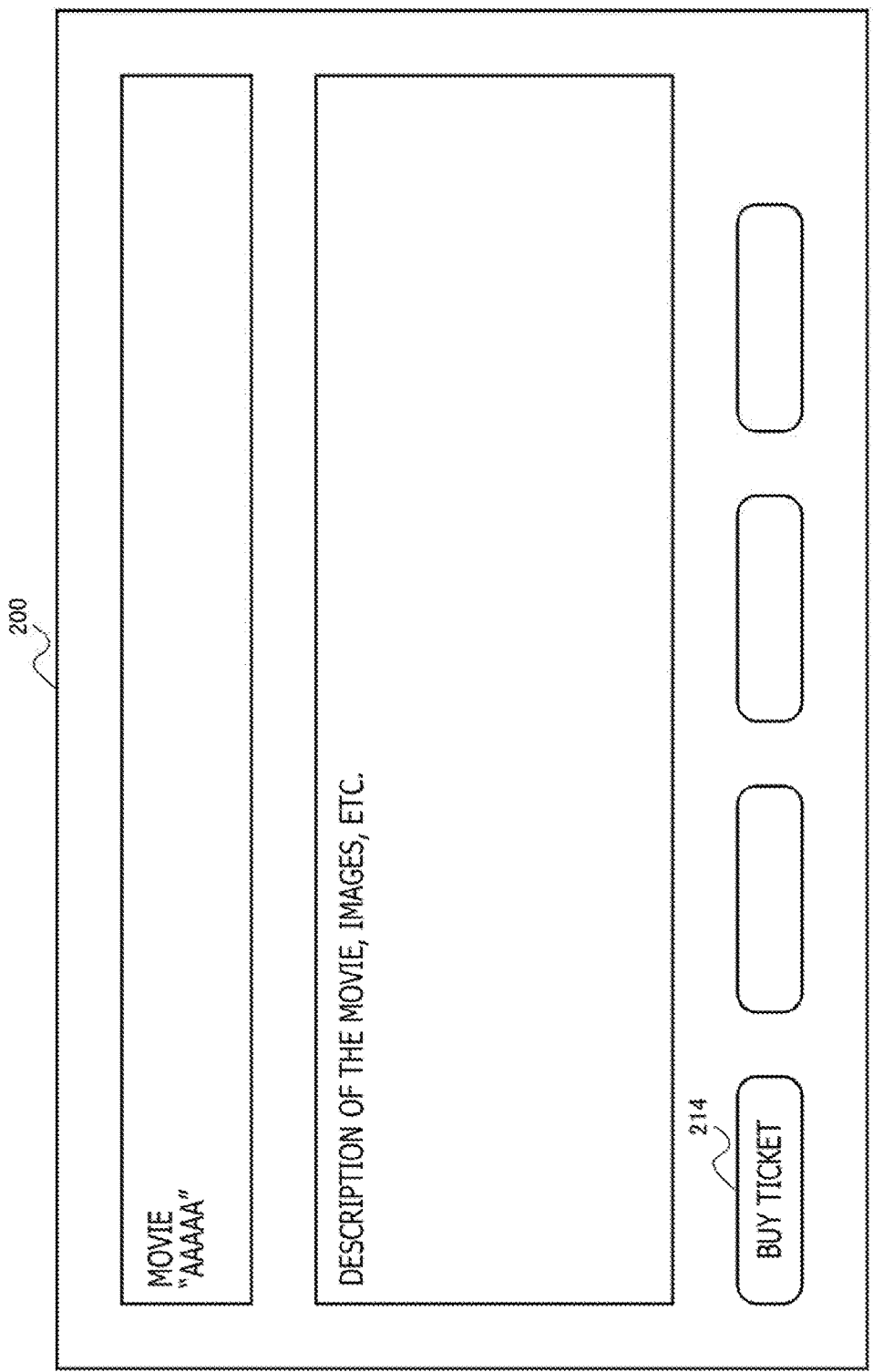
FIG. 11 is a diagram illustrating an example of a theater App screen.

FIG. 11 illustrates an example of the theater App screen 200. In the case where the second user has yet to purchase a ticket of the target video, the image generation section 36 of the information processing apparatus 10b arranges a purchase icon 214 on the theater App screen 200 after the acceptance of the invitation. In the case where the second user selects the purchase icon 214, the image generation section 36 of the information processing apparatus 10b may generate a target video ticket purchase screen and cause the screen to be displayed. The acceptance notification section 48 of the information processing apparatus 10b may, in the case where the second user has yet to purchase a ticket of the target video, refrain from sending acceptance data on one hand, and on the other hand, send acceptance data to the information processing apparatus 10a in response to the purchase of a ticket of the target video on the information processing apparatus 10b.

Second Embodiment

The entertainment system 1 of a second embodiment also realizes a "Watch Together" viewing experience for a plurality of users in a manner similar to viewing a video in a real-life movie theater by synchronizing the reproduction and display of a video on a plurality of HMDs worn by a plurality of users as does the entertainment system 1 of the first embodiment. On the other hand, the entertainment system 1 of the second embodiment realizes the purchase of a plurality of tickets (i.e., viewing rights) by the first user. The entertainment system 1 of the second embodiment provides a viewing experience that allows the first and second users to watch the same video at the same time by using the plurality of tickets possessed by the first user. That is, the second embodiment permits the giving of a ticket as a present from one user to another.

The entertainment system 1 of the second embodiment is configured in a similar manner to the entertainment system 1 of the first embodiment illustrated in FIG. 1. The functional blocks of the information processing apparatus 10 of the second embodiment are similar to the functional blocks of the information processing apparatus 10 of the first embodiment illustrated in FIG. 4. The functional blocks of the delivery server 3 of the second embodiment are similar to the functional blocks of the delivery server 3 of the first embodiment illustrated in FIG. 5. Hereinafter, the description recited in the first embodiment will be omitted as appropriate to avoid repeated description, and a primary focus will be placed on differences from the first embodiment.

The invitation transmission section 42 of the information processing apparatus 10a sends an invitation with a ticket of the target video for viewing with the second user to the information processing apparatus 10b of the second user in response to manipulation of the first user. The invitation with a ticket of the target video is intended to allow the second user to view the target video by using a ticket possessed by the first user.

The second embodiment causes the information processing apparatus 10b of the second user to initiate the display of the video synchronously with causing the information processing apparatus 10a of the first user to initiate the display of the target video in the case where the second user accepts the invitation with a ticket irrespective of whether or not the second user has a ticket of the target video. That is, the second user who has accepted the invitation with a ticket can view the target video with the first user at the same time by using a ticket possessed by the first user.

The image generation section 36 of the information processing apparatus 10a displays content for causing the first user to select either an invitation with a ticket or an invitation with no ticket. The information processing apparatus 10a allows the invitation transmission section 42 to send an invitation with a ticket to the information processing apparatus 10b in the case where the first user has a plurality of tickets of the target video.

In the second embodiment, the acceptance notification section 48 of the information processing apparatus 10b can send, to the information processing apparatus 10a, acceptance data to the effect that an invitation with a ticket will be accepted irrespective of whether or not the second user has a viewing right to the target video. The request transmission section 32 of the information processing apparatus 10a includes a function of an instruction issuing section to cause the information processing apparatus 10b to perform a process of initiating the display of a video synchronously with causing the information processing apparatus 10a to initiate the display of the same video in the case where acceptance data is received from the information processing apparatus 10b. The request transmission section 32 of the second embodiment sends, to the delivery server 3, data requesting the delivery of the video to the information processing apparatus 10a and the information processing apparatus 10b by using a plurality of tickets possessed by the first user.

A description will be given of operation of the entertainment system 1 of the second embodiment configured as described above.

Figure 12:
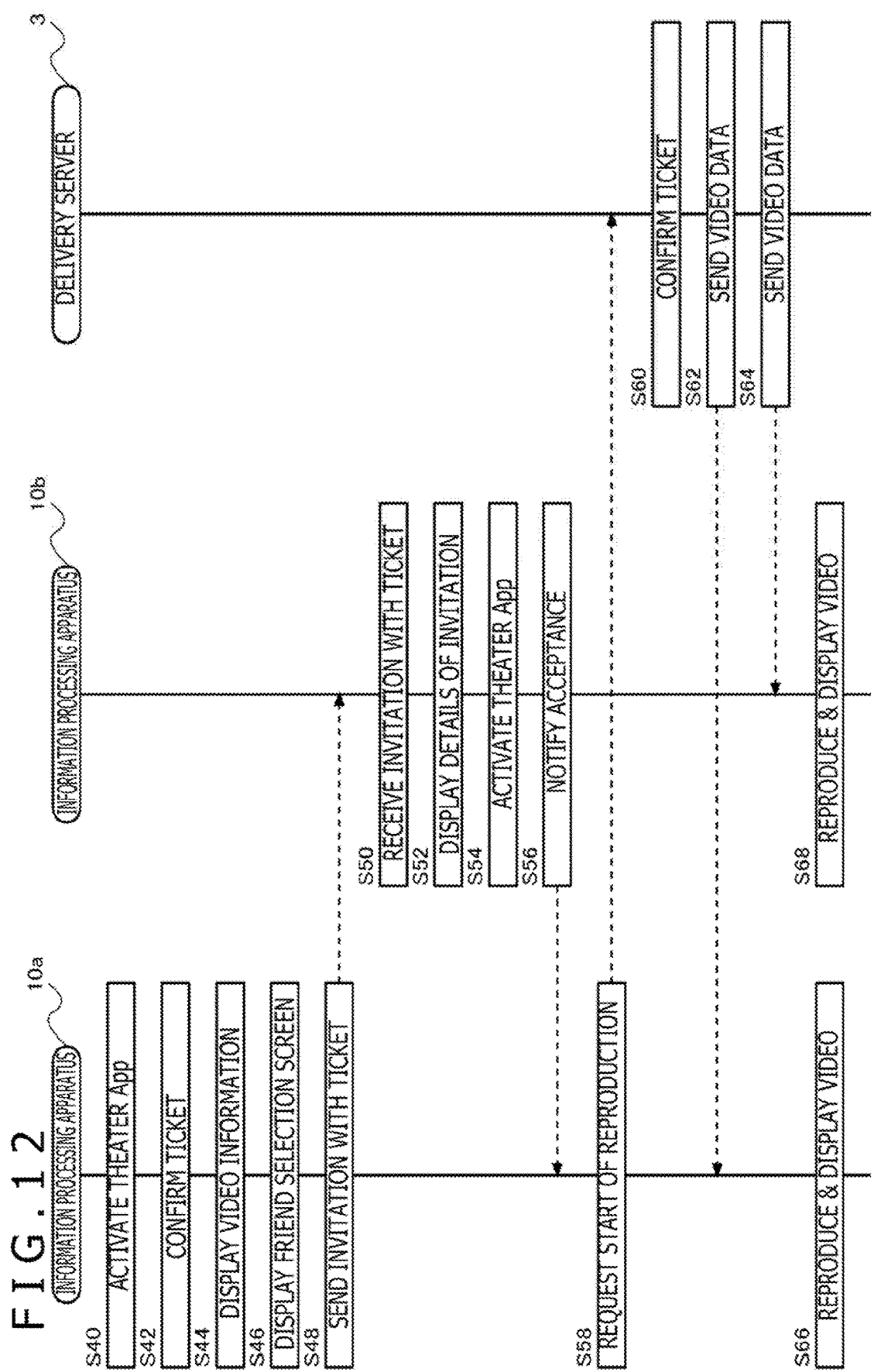
FIG. 12 is a diagram illustrating operation of the entertainment system of a second embodiment.

FIG. 12 is a diagram illustrating operation of the entertainment system 1 of the second embodiment. FIG. 12 illustrates operation in the case where the first user manipulating the information processing apparatus 10a invites the second user manipulating the information processing apparatus 10b for video viewing and the first and second users view the same video at the same time. Here, it is assumed that while the first user has purchased a plurality of tickets of the target video, the second user has yet to purchase a ticket of the target video.

The first user activates the theater App on the information processing apparatus 10a (S40). The image generation section 36 of the information processing apparatus 10a generates theater App screen data, and the image output section 40 causes the HMD 100a to display the theater App screen. The manipulation reception section 30 receives manipulation of the first user specifying the target video. The ticket confirmation section 46 refers to the ticket storage section 26 and confirms whether or not the first user has already purchased a plurality of tickets of the target video in response to input of manipulation specifying the target video (S42).

Figure 13:
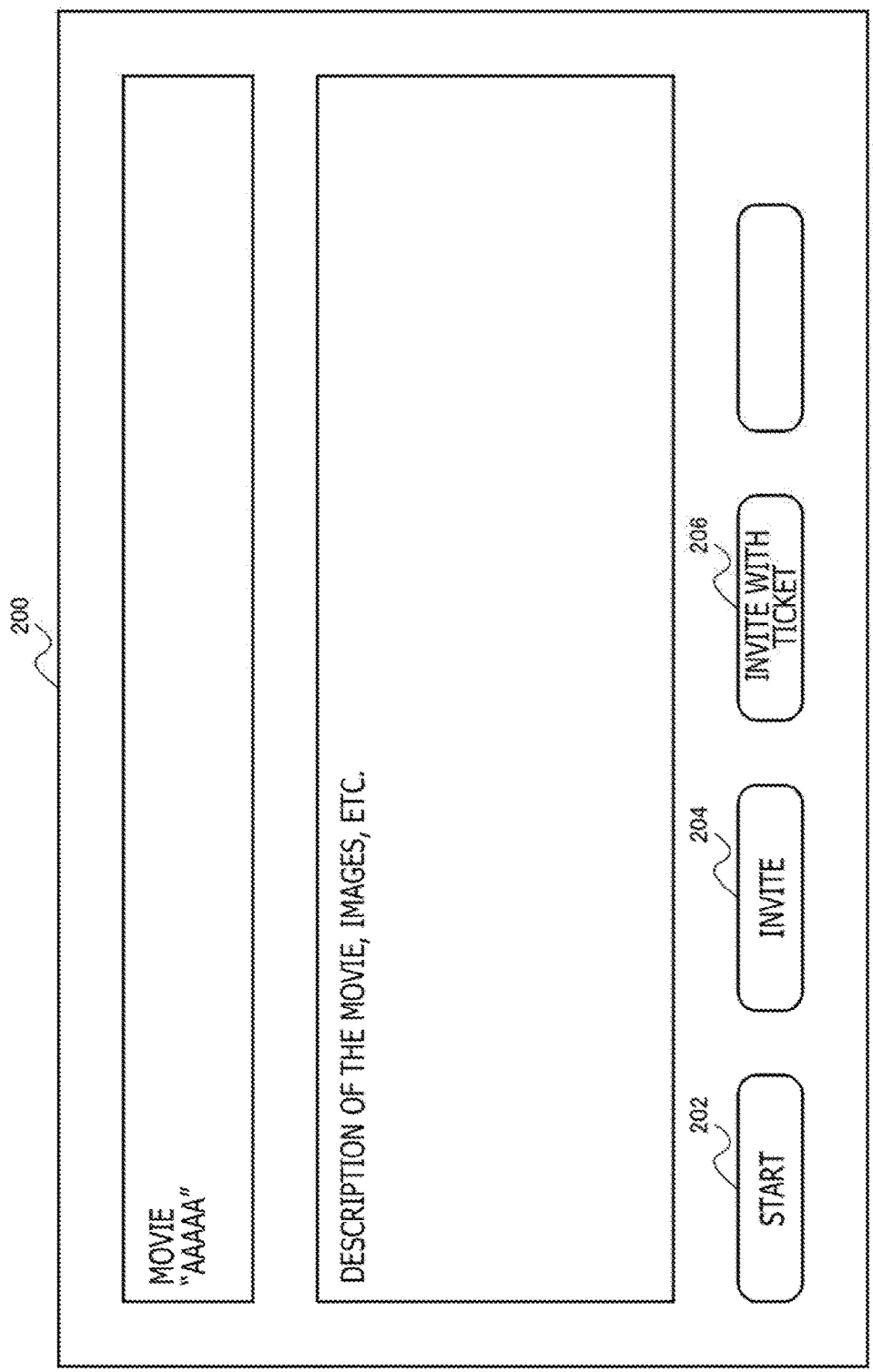
FIG. 13 is a diagram illustrating an example of a theater App screen.

FIG. 13 is a diagram illustrating an example of the theater App screen. FIG. 13 illustrates the theater App screen 200 in the case where the first user has purchased a plurality of tickets of the target video. In the case where the first user has purchased a plurality of tickets of the target video, the image generation section 36 arranges, on the theater App screen 200 depicting information of the target video, the start icon 202 and the invite icon 204 and further arranges an invite icon 206 with a ticket (S44). In the case where the first user has only one ticket of the target video, the image generation section 36 arranges the start icon 202 and the invite icon 204 but not the invite icon 206 with a ticket on the theater App screen 200 depicting information of the target video.

The first user selects the invite icon 204 in the case where the first user invites the second user for video viewing by using a ticket possessed by the second user. In this case, the second user typically has a ticket of the target video. On the other hand, the first user selects the invite icon 206 with a ticket in the case where the first user invites the second user for video viewing by using a ticket possessed by the first user himself or herself. In this case, the second user does not typically have a ticket. Here, the first user selects the invite icon 206 with a ticket. It should be noted that the operation of the entertainment system 1 of the second embodiment will be the same as in the first embodiment in the case where the first user selects the invite icon 204.

Referring back to FIG. 12, the manipulation reception section 30 receives manipulation of the first user selecting the invite icon 206 with a ticket on the theater App screen 200. The image generation section 36 causes the friend selection screen illustrated in FIG. 8 to be displayed (S46). When the send icon 212 is selected on the friend selection screen, the invitation transmission section 42 sends invitation data with a ticket regarding the target video to the information processing apparatus 10b of the second user (S48).

In the second embodiment, the first user can select the invite icon 206 with a ticket on condition that the first user has already purchased a plurality of tickets of the target video. As a modification example, the ticket confirmation section 46 of the information processing apparatus 10a may confirm whether or not the first user has already purchased a plurality of tickets of the target video in the case where the invite icon 206 with a ticket is selected on the theater App screen 200. In the case where the first user has yet to purchase a plurality of tickets of the target video, the invitation transmission section 42 may refrain from sending invitation data with a ticket. The image generation section 36 may cause a message to be displayed to the effect that it is difficult to send an invitation with a ticket unless a plurality of tickets of the target video are purchased, on the theater App screen 200.

The description of subsequent processes from S50 to S56 will be omitted because these processes are the same as those in S18, S20, S24, and S26 of the first embodiment illustrated in FIG. 6. The process in step S22 of the first embodiment is not performed in the entertainment system 1 of the second embodiment. That is, the acceptance notification section 48 of the information processing apparatus 10b sends acceptance data to the information processing apparatus 10a in the case where manipulation of the second user selecting the join icon 304 on the invitation card image 302 is received irrespective of whether or not the second user has already purchased a ticket of the target video.

The request transmission section 32 of the information processing apparatus 10a sends delivery request data to the delivery server 3 when the acceptance data sent from the information processing apparatus 10b is received, and in parallel, when the first user selects the start icon 202 on the theater App screen 200 (S58). The delivery request data in the second embodiment includes ticket usage information in addition to identification information of the target video and identification information of the viewer. The ticket usage information indicates the owner (purchaser) of the ticket and the number of tickets used. In this example, the ticket owner is the first user, and the number of tickets is two.

The request reception section 70 of the delivery server 3 receives the delivery request data sent from the information processing apparatus 10a. The ticket processing section 72 confirms whether or not the ticket usage information of the delivery request data is correct by referring to the ticket storage section 66 (S60). In this example, the ticket processing section 72 confirms whether or not the first user has already purchased two or more tickets of the target video. In the case where the ticket usage information of the delivery request data is correct, the process proceeds to a video delivery process. The description of processes from S62 to S68 will be omitted because these processes are the same as those from S32 to S38 of the first embodiment illustrated in FIG. 6.

The present disclosure has been described above on the basis of the first and second embodiments. It is to be understood by those skilled in the art that these embodiments are illustrative, that the combination of components and processes can be modified in various ways, and that these modification examples also fall within the scope of the present disclosure.

A description will be given below of a first modification example applicable to both the first and second embodiments. The image generation section 36 of the information processing apparatus 10a may arrange avatar images (in other words, character images) of the first and second users in the theater room 220 depicted in FIG. 10. Similarly, the image generation section 36 of the information processing apparatus 10b may arrange avatar images of the first and second users in the theater room 220. In the case where the VR image represents a first-person perspective, the image generation section 36 of the information processing apparatus 10a may arrange an avatar image of the second user in the theater room 220, and the image generation section 36 of the information processing apparatus 10b may arrange an avatar image of the first user in the theater room 220.

The information processing apparatus 10a may send posture information (e.g., position, posture, direction of line of sight) of the HMD 100a to the information processing apparatus 10b, and the information processing apparatus 10b may send posture information of the HMD 100b to the information processing apparatus 10a. The image generation section 36 of the information processing apparatus 10a may change the position and posture of the avatar image of the second user in such a manner as to match posture information of the HMD 100b sent from the information processing apparatus 10b. Similarly, the image generation section 36 of the information processing apparatus 10b may change the position and posture of the avatar image of the first user in such a manner as to match posture information of the HMD 100a sent from the information processing apparatus 10a.

A description will be given below of a second modification example applicable to both the first and second embodiments. Ticket information possessed by each user may be stored only in the local information processing apparatus 10 of each user. In this case, the information processing apparatus 10 of each user may cause the delivery server 3 to perform ticket confirmation by sending ticket information to the delivery server 3 together with a video delivery request. Conversely, ticket information possessed by each user may be stored only in the delivery server 3. In this case, the information processing apparatus 10 of each user may refer to ticket information stored in the delivery server 3 as necessary.

A description will be given below of a third modification example applicable to both the first and second embodiments. Although no mention is made in the above embodiments, the ticket processing section 72 of the delivery server 3 may delete information regarding a ticket possessed by a user stored in the ticket storage section 66 at the start or end of delivery in the case where a video is delivered to the information processing apparatus 10. The ticket processing section 72 of the delivery server 3 may send, to the information processing apparatus 10, data instructing that ticket information stored in the ticket storage section 26 of the information processing apparatus 10 be deleted in the case where ticket information in the ticket storage section 66 is deleted.

A description will be given below of a fourth modification example applicable to both the first and second embodiments. Although the HMDs 100 displays a video in the above embodiments, the technology described in the embodiments is not limited thereto. The technology described in the embodiments is also applicable to a system for causing an ordinary display such as the output apparatuses 15 to display a video, and an advantageous effect similar to that in the above embodiments can be achieved.

A description will be given below of a fifth modification example applicable to both the first and second embodiments. In the above embodiments, the delivery server 3 delivers, by streaming, video data to the information processing apparatus 10a and the information processing apparatus 10b and synchronized the display of the target video on the HMD 100a with the display of the target video on the HMD 100b. As a modification example, in the case where the information processing apparatus 10a and the information processing apparatus 10b have already downloaded the entire video data, for example, the request transmission section 32 of the information processing apparatus 10a may send given instruction data to the information processing apparatus 10b, thus coordinating the image generation section 36 (image output section 40) of the information processing apparatus 10a with the image generation section 36 (image output section 40) of the information processing apparatus 10b and synchronizing the display of the target video on the HMD 100a with the display of the target video on the HMD 100b.

An arbitrary combination of the above embodiments and modification examples is also effective as an embodiment of the present disclosure. The new embodiment arising from the combination provides advantageous effects of the embodiments and modification examples combined. It is to be understood by those skilled in the art that the function to be delivered by each of the components recited in claims is realized by each of the components depicted in the embodiments and modification examples alone or coordination thereof.

The technology recited in the above embodiments and modification examples may be identified by the following features:

[Feature 1]

A video display system including:

an apparatus of a first user having a viewing right to a given video;

a second user apparatus; and a display control section, in which the first user apparatus sends an invitation for viewing of the video to the second user apparatus, in which the second user apparatus causes the video viewing invitation to be displayed, and the display control section causes the second user apparatus to initiate display of the video synchronously with causing the first user apparatus to initiate the display of the video in a case where the second user has a viewing right to the video and in a case where manipulation for accepting the invitation is input to the second user apparatus.

This video display system allows the first user and the second user who has accepted the invitation of the first user to view the same video at the same timing in the case where both the first and second users have a viewing right to the video. This makes it possible to provide an innovative "Watch Together" viewing experience to each user in a manner similar to viewing in a real-life movie theater.

[Feature 2]

The video display system of Feature 1, in which in the case where the second user does not have a viewing right to the video, the display control section causes the second user apparatus to display content for purchasing the viewing right.

This video display system can enhance, in the case where the second user does not have a viewing right to the video, opportunities for the first and second users to view the same video at the same timing by encouraging the second user to purchase the viewing right.

[Feature 3]

A video display system including:

an apparatus of a first user having a viewing right to a given video;

a second user apparatus; and a display control section, in which the first user apparatus sends an invitation for viewing of the video with the viewing right to the second user apparatus, the second user apparatus causes the video viewing invitation to be displayed, and the display control section causes the second user apparatus to initiate display of the video synchronously with causing the first user apparatus to initiate the display of the video in a case where manipulation for accepting the invitation is input to the second user apparatus irrespective of whether or not the second user has a viewing right to the video.

This video display system allows the first user and the second user who has accepted the invitation of the first user to view the same video at the same timing by using a viewing right possessed by the first user even in the case where the second user does not have a viewing right to the video. This makes it possible to provide an innovative "Watch Together" viewing experience to each user in a manner similar to viewing in a real-life movie theater. The second user does not typically purchase a viewing right to the video, thus enhancing opportunities for a plurality of users to synchronously view a video.

[Feature 4]

The video display system of Feature 3, in which in a case where the first user has a plurality of viewing rights to the video, the first user apparatus may send an invitation with the viewing right to the second user apparatus.

This video display system permits proper management of video viewing rights in the case where the first and second users synchronously view a video at the same time by causing the second user to use a viewing right possessed by the first user.

[Feature 5]

The video display system of Feature 3 or 4, in which the first user apparatus causes content for causing the first user to select either an invitation with the viewing right or an invitation with no viewing right to be displayed.

This video display system allows the first user to select an appropriate type of invitation in accordance with a relationship between the first and second users, users' possession or no possession of viewing rights, and other conditions.

[Feature 6]

The video display system of any one of Features 1 to 5, in which both the first and second user apparatuses cause a head-mounted display to display, on a movie screen provided in a virtual space, a display image in which the video is reproduced.

This video display system makes it more likely for the first and second users using head-mounted displays to perceive a sensation of viewing a video together in a movie theater.

[Feature 7]

An information processing apparatus being an apparatus of a first user having a viewing right to a given video, the information processing apparatus including:

an invitation transmission section adapted to send an invitation for viewing of the video to a second user apparatus; and an instruction issuing section, in which the second user apparatus may send data to an effect that the second user accepts the invitation in a case where the second user has a viewing right to the video, and the instruction issuing section performs a process of causing the second user apparatus to initiate display of the video synchronously with causing the information processing apparatus to initiate the display of the video in a case where the data to the effect that the second user has accepted the invitation is received from the second user apparatus.

This information processing apparatus provides a similar advantageous effect to that of the video display system of Feature 1.

[Feature 8]

An information processing apparatus being an apparatus of a first user having a viewing right to a given video, the information processing apparatus including:

an invitation transmission section adapted to send an invitation for viewing of the video with the viewing right to a second user apparatus; and an instruction issuing section, in which the second user apparatus may send data to an effect that the second user accepts the invitation with the viewing right irrespective of whether or not the second user has the viewing right to the video, and the instruction issuing section performs a process of causing the second user apparatus to initiate display of the video synchronously with causing the information processing apparatus to initiate the display of the video in a case where the data to the effect that the second user has accepted the invitation with the viewing right is received from the second user apparatus.

This information processing apparatus provides a similar advantageous effect to that of the video display system of Feature 3.

[Feature 9]

A video display method carried out by an apparatus of a first user having a viewing right to a given video, the video display method including:

sending an invitation for viewing of the video to a second user apparatus; and issuing an instruction, in which the second user apparatus may send data to an effect that the second user accepts the invitation in a case where the second user has a viewing right to the video, and the instruction is issued to perform a process of causing the second user apparatus to initiate display of the video synchronously with causing the first user apparatus to initiate the display of the video in a case where the data to the effect that the second user has accepted the invitation is received from the second user apparatus.

This video display method provides a similar advantageous effect to that of the video display system of Feature 1.

[Feature 10]

A video display method carried out by an apparatus of a first user having a viewing right to a given video, the video display method including:

sending an invitation for viewing of the video with the viewing right to a second user apparatus; and issuing an instruction, in which the second user apparatus may send data to an effect that the second user accepts the invitation with the viewing right irrespective of whether or not the second user has the viewing right to the video, and the instruction is issued to perform a process of causing the second user apparatus to initiate display of the video synchronously with causing the first user apparatus to initiate the display of the video in a case where the data to the effect that the second user has accepted the invitation with the viewing right is received from the second user apparatus.

This video display method provides a similar advantageous effect to that of the video display system of Feature 3.

The present disclosure contains subject matter related to that disclosed in Japanese Priority Patent Application JP 2019-42758 filed in the Japan Patent Office on Mar. 8, 2019, the entire content of which is hereby incorporated by reference.

What is claimed is:

1. A video display system comprising:
an apparatus of a first user having a viewing right to a given video;
a second user apparatus; and
a display control section, wherein
the first user apparatus sends an invitation for viewing of the video to the second user apparatus,
the second user apparatus causes the video viewing invitation to be displayed,
wherein the invitation is displayed as a virtual reality (VR) greeting image depicting details of the invitation, and
wherein the VR image includes an indication if a ticket is held by the second user apparatus for the video; and
the display control section causes the second user apparatus to initiate display of the video synchronously with causing the first user apparatus to initiate the display of the video in a case where the second user has a viewing right to the video and in a case where manipulation for accepting the invitation is input to the second user apparatus,
wherein display of the video on the second apparatus is started when a request for reproduction is initiated on the apparatus of the first user, and
wherein acknowledgement of the acceptance of the invitation is sent to the apparatus of the first user.

2. The video display system according to claim 1, wherein in the case where the second user does not have a viewing right to the video, the display control section causes the second user apparatus to display content for purchasing the viewing right.

3. A video display system comprising:
an apparatus of a first user having a viewing right to a given video;
a second user apparatus; and
a display control section, wherein
the first user apparatus sends an invitation for viewing of the video with the viewing right to the second user apparatus,
wherein the invitation is displayed as a virtual reality (VR) greeting image depicting details of the invitation, and
wherein the VR image includes an indication if a ticket is held by the second user apparatus for the video,
wherein the second user apparatus causes the video viewing invitation to be displayed, and
wherein the display control section causes the second user apparatus to initiate display of the video synchronously with causing the first user apparatus to initiate the display of the video in a case where manipulation for accepting the invitation is input to the second user apparatus irrespective of whether or not the second user has a viewing right to the video,
wherein display of the video on the second apparatus is started when a request for reproduction is initiated on the apparatus of the first user, and
wherein acknowledgement of the acceptance of the invitation is sent to the apparatus of the first user.

4. The video display system according to claim 3, wherein in a case where the first user has a plurality of viewing rights to the video, the first user apparatus sends an invitation with the viewing right to the second user apparatus.

5. The video display system according to claim 3, wherein the first user apparatus causes content for causing the first user to select either an invitation with the viewing right or an invitation with no viewing right to be displayed.

6. An information processing apparatus being an apparatus of a first user having a viewing right to a given video, the information processing apparatus comprising:
an invitation transmission section adapted to send an invitation for viewing of the video to a second user apparatus,
wherein the invitation is displayed as a virtual reality (VR) greeting image depicting details of the invitation, and
wherein the VR image includes an indication if a ticket is held by the second user apparatus for the video; and
an instruction issuing section, wherein
the second user apparatus sends data to an effect that the second user accepts the invitation in a case where the second user has a viewing right to the video, and
the instruction issuing section performs a process of causing the second user apparatus to initiate display of the video synchronously with causing the information processing apparatus to initiate the display of the video in a case where the data to the effect that the second user has accepted the invitation is received from the second user apparatus,
wherein display of the video on the second apparatus is started when a request for reproduction is initiated on the apparatus of the first user, and
wherein acknowledgement of the acceptance of the invitation is sent to the apparatus of the first user.

7. An information processing apparatus being an apparatus of a first user having a viewing right to a given video, the information processing apparatus comprising:
an invitation transmission section adapted to send an invitation for viewing of the video with the viewing right to a second user apparatus,
wherein the invitation is displayed as a virtual reality (VR) greeting image depicting details of the invitation, and wherein the VR image includes an indication if a ticket is held by the second user apparatus for the video; and an instruction issuing section, wherein the second user apparatus sends data to an effect that the second user accepts the invitation with the viewing right irrespective of whether or not the second user has the viewing right to the video, and the instruction issuing section performs a process of causing the second user apparatus to initiate display of the video synchronously with causing the information processing apparatus to initiate the display of the video in a case where the data to the effect that the second user has accepted the invitation with the viewing right is received from the second user apparatus, wherein display of the video on the second apparatus is started when a request for reproduction is initiated on the apparatus of the first user, and wherein acknowledgement of the acceptance of the invitation is sent to the apparatus of the first user.

8. A video display method carried out by an apparatus of a first user having a viewing right to a given video, the video display method comprising:

sending an invitation for viewing of the video to a second user apparatus, wherein the invitation is dis laved as a virtual reality VR greeting image depicting details of the invitation, and wherein the VR image includes an indication if a ticket is held by the second user apparatus for the video; and issuing an instruction, wherein the second user apparatus sends data to an effect that the second user accepts the invitation in a case where the second user has a viewing right to the video, and the instruction is issued to perform a process of causing the second user apparatus to initiate display of the video synchronously with causing the first user apparatus to initiate the display of the video in a case where the data to the effect that the second user has accepted the invitation is received from the second user apparatus, wherein display of the video on the second apparatus is started when a request for reproduction is initiated on the apparatus of the first user, and wherein acknowledgement of the acceptance of the invitation is sent to the apparatus of the first user.

9. A video display method carried out by an apparatus of a first user having a viewing right to a given video, the video display method comprising:

sending an invitation for viewing of the video with the viewing right to a second user apparatus, wherein the invitation is displayed as a virtual reality (VR) greeting image depicting details of the invitation, and wherein the VR image includes an indication if a ticket is held by the second user apparatus for the video; and issuing an instruction, wherein the second user apparatus sends data to an effect that the second user accepts the invitation with the viewing right irrespective of whether or not the second user has the viewing right to the video, and the instruction is issued to perform a process of causing the second user apparatus to initiate display of the video synchronously with causing the first user apparatus to initiate the display of the video in a case where the data to the effect that the second user has accepted the invitation with the viewing right is received from the second user apparatus, wherein display of the video on the second apparatus is started when a request for reproduction is initiated on the apparatus of the first user, and wherein acknowledgement of the acceptance of the invitation is sent to the apparatus of the first user.

\* \* \* \* \*